Nov. 24, 1936.   W. H. SHIFFLER ET AL   2,061,810
PROCESS OF DISTILLING ALCOHOLS
Original Filed March 3, 1933
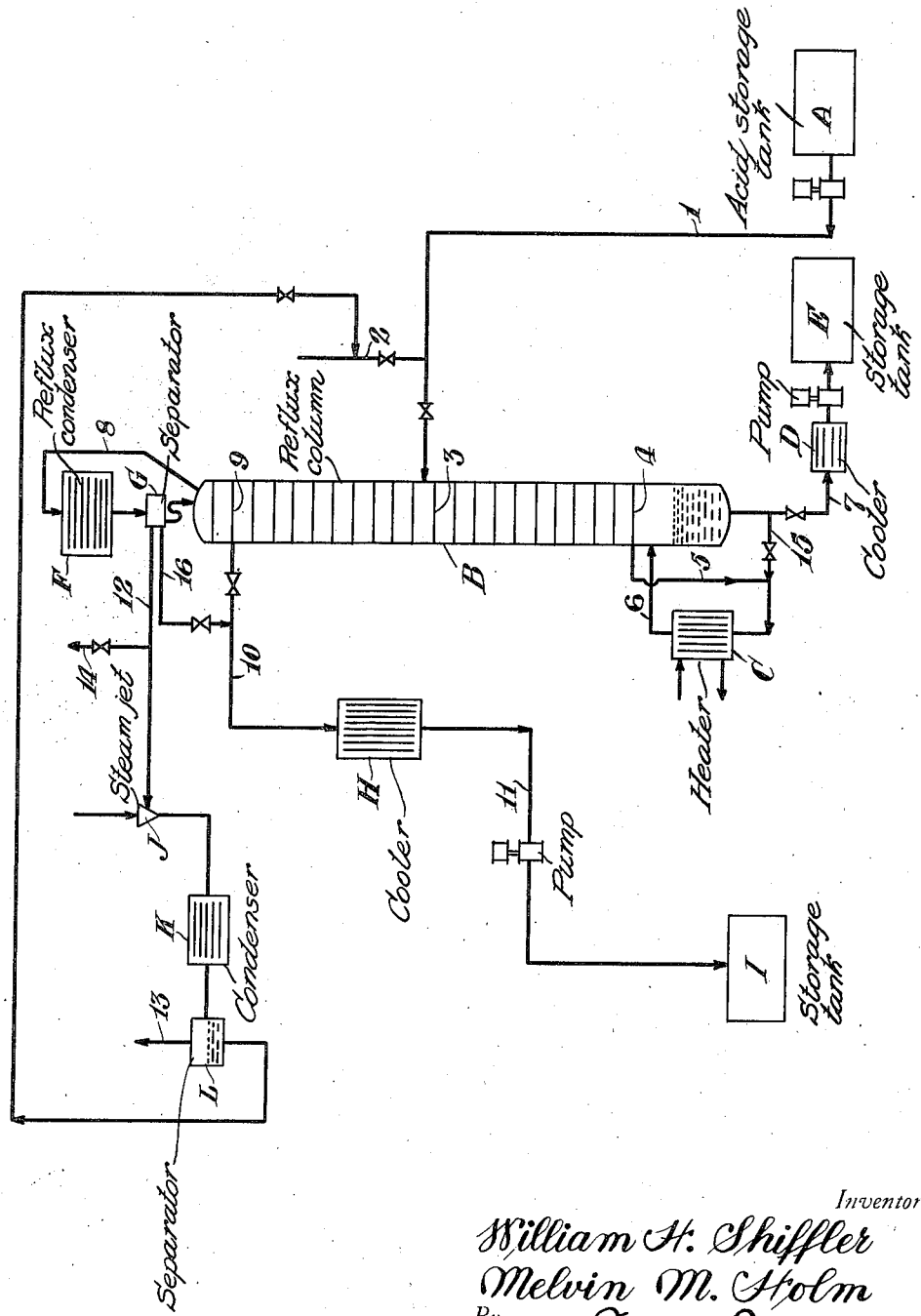
Inventors
William H. Shiffler
Melvin M. Holm
By Lyon & Lyon
Attorneys Patented Nov. 24, 1936

2,061,810

UNITED STATES PATENT OFFICE 2,061,810

PROCESS OF DISTILLING ALCOHOLS

William H. Shiffler and Melvin M. Holm, Berkeley, Calif., assignors to Standard Oil Company of California, San Francisco, Calif., a corporation of Delaware Application March 3, 1933, Serial No. 659,494
Renewed November 27, 1935

19 Claims. (Cl. 202—41)

This invention relates to a process of producing alcohols from sulphuric acid absorption products of olefines, and refers particularly to the production of secondary and tertiary alcohols from the sulphur acid absorption products of olefines containing from three to five carbon atoms, inclusive.

Olefins containing from three to five carbon atoms, inclusive, i. e., propylene, the normal butenes, isobutene and amylenes are ordinarily converted into alcohols by reaction with or absorption by sulphuric acid with the formation of the alkyl sulphuric acids. These sulphuric acid absorption products are then diluted with water or neutralized to effect conversion of the alkyl sulphuric acids to the alcohols and the alcohols are removed by distillation. The strengths of the acids used for absorption and the temperatures under which the absorption is carried out vary and are determined by the reactivity of the several olefins with sulphuric acid.

The principal commercial difficulties in the conversion of these olefins to corresponding alcohols lies, first, in the ease with which they polymerize to heavier oils in the absorption step, and, second, in the ease with which the acid absorption products are in part polymerized and in part decomposed to reform the original olefins during the distillation step. In an endeavor to avoid these losses due to polymerization and decomposition, the commercial art has been led to develop other methods than the sulphuric acid absorption method for the production of certain of the alcohols, particularly the butyl and amyl alcohols, notably through the formation of the chlorides.

In the distillation step from the sulphuric acid absorption products the tendency is more definitely towards decomposition into the original olefins in the case of the secondary alcohols and towards polymerization in the case of tertiary alcohols. This difficulty is so real and the loss is so great that tertiary butyl alcohol and tertiary amyl alcohol are not ordinarily distilled from the diluted acid absorption product without first neutralizing the acid liquid with alkali prior to distillation.

In other cases, as in that of the secondary butyl alcohol, the acid reaction products are diluted to such an extent in an attempt to avoid the aforesaid losses, that the economy of reconcentrating the acid for re-use as an absorbent becomes questionable and is in any event costly.

In the co-pending application of Shiffler, Holm and Miller, Serial No. 477,146, filed August 22, 1930, there is described a process of distilling alcohols without appreciably diluting them or neutralizing them prior to their actual volatilization through the certain uses of reduced pressure during distillation.

We have now discovered that these alcohols may be distilled at ordinary pressures without appreciable prior dilution of the absorption products or neutralizing the absorption products if the distillation is carried out continuously and with the exercise of certain precautions hereinafter pointed out. Moreover, we have discovered that by a certain manner of continuously distilling the alcohols the results obtained, particularly the yield of alcohol and concentration thereof when using vacuum distillation, may be improved to a surprising extent through the operation of our continuous plan of distillation.

While the present invention is found of particular value in distilling alcohols of secondary and tertiary class, since those alcohols are the most difficult to distill, the process has proven to be of value with respect to the distillation of other alcohols, particularly including ethyl alcohol.

The present invention, together with various objects and advantages thereof, will best be understood from a description of a preferred form or example of a process embodying the invention as the process is carried out in a suitable apparatus. For this purpose the process is hereinafter described in connection with the apparatus illustrated in the accompanying drawing.

In the drawing, the figure is a diagrammatic elevation of the apparatus.

Referring to the drawing, the apparatus and its operation will best be understood by reference to a specific example of the distillation of secondary butyl alcohol at 0.15 atmosphere pressure.

An acid liquor in the storage tank A, equivalent in composition to 63.4% sulfuric acid, 24.3% water, and 12.3% secondary butyl alcohol by weight, is pumped through line 1 and mixed with 8% of its weight of water from line 2. The admixture is delivered into the column B, entering in about the center of the column.

The column B may be any usual or preferred type of reflux column having suitable plates. The partially diluted acid liquor which enters at the feed plate 3 is further diluted in the column with water secondary butyl alcohol reflux from the upper section of the column, and is met from below by rising steam generated by heater C. In traversing the lower portion of the column the diluted acid liquor is substantially completely stripped of its secondary butyl alcohol content.

Alcohol-free acid from the bottom plate 4 of the tower is piped through line 5 to heater C. Line 6 delivers a mixture of steam and hot liquid 70% by weight sulfuric acid. The hot 70% acid is withdrawn through line 7 and passed through a cooler D, and thence pumped to the storage vessel E.

In the upper section of the column B dilute secondary butyl alcohol vapors rising from the feed plate 3 are concentrated. The concentrated secondary butyl alcohol vapor from the top of the column is piped through line 8 to reflux condenser F. The condensed secondary butyl alcohol goes to liquid-gas separator G and thence is refluxed back to the top of the column. Hot liquid alcohol yield, containing 70% secondary butyl alcohol by weight, is withdrawn from plate 9, and piped through line 10 to cooler H. The cold secondary butyl alcohol is pumped through line 11 to storage vessel I. Gas separated in separator G, consisting largely of butenes resulting from slight decomposition of the secondary butyl alcohol, is piped through line 12 to steam jet J and condenser K. The cold mixture of gas and water goes to liquid gas separator L from which the gas is rejected through line 13. The separated water contains a slight concentration of alcohol and may suitably be used as diluting water fed through line 2.

Experience has shown that a column equivalent in effect to six perfect plates is suitable for the distillation of secondary butyl alcohol. When feeding the indicated acid liquor to such a column, and withdrawing the indicated 70% alcohol yield, a reflux ratio of three mols. of reflux to one mol. of secondary butyl alcohol-water product is suitable. Given such conditions, charging the feed to the third perfect plate below yield plate 9, and knowing the liquid-vapor composition diagrams for secondary butyl alcohol-water and secondary butyl alcohol-water-sulfuric acid mixtures, the weight percentage composition of the liquid on the various plates in the column may be tabulated:

| | Percent acid | Percent alcohol | Percent water |
|---|---|---|---|
| Bottom plate | 51.3 | 0.01 | 48.7 |
| Feed plate | 50.9 | 1.1 | 48.0 |
| Liquid reflux to feed plate | 0.0 | 3.1 | 96.9 |
| Yield plate | 0.0 | 70.0 | 30.0 |

In the above example operation at reduced pressure is described. For distillation of certain alcohols we actually prefer to operate at atmospheric pressure. For example, in the distillation of tertiary butyl alcohol a recovery of 95.5% has been obtained at atmospheric pressure and 99.7% at 0.15 atmosphere. However, the economic advantage of increased recovery of the secondary butyl alcohol is, in this instance, more than counteracted by the increased investment in equipment required for the reduced pressure distillation. Referring again to the diagram, operation at atmospheric pressure is entirely similar to reduced pressure distillation with the exceptions that the steam jet J is not connected and olefine gas separated at G is rejected through line 14 rather than 13.

Two points regarding the diagram and above description require further mention. We have indicated that the secondary butyl alcohol yield is withdrawn directly from the column rather than from liquid-gas separator G. This procedure minimizes the concentration of dissolved olefine in the product, thereby improving the odor. The second point concerns the method of concentrating the dilute acid leaving bottom plate 4. The acid charged to heater C is piped directly from the bottom plate rather than from the liquid trap below the plate, for two reasons: first, the average concentration of the acid boiled in heater C is reduced to a minimum, permitting maximum heat transfer and minimizing corrosion; secondly, the indicated procedure makes the heater function as an addition to the stripping section of the column, small amounts of secondary butyl alcohol reaching the bottom of the column having a further chance of being removed by distillation from a relatively dilute acid.

Line 15 is a convenient connection for starting and stopping the continuous distillation. When starting a distillation, for example, water may be added through line 2 and water or dilute acid cycled through line 15 to heater C until the whole column becomes heated. The acid liquor feed may then be started, the excess water in the system withdrawn through the alcohol yield line, and the valve in line 15 closed.

Line 16 is useful when the presence of a slight concentration of dissolved olefine in the alcohol yield is not detrimental; or when producing ethyl alcohol the solubility of ethylene in cold alcohol is so slight that the importance of further reducing its concentration by withdrawing hot yield from the column is minimized. In such cases, the valve in line 10 is closed, cold alcohol is withdrawn from separator G through line 16, and the use of cooler H is not essential.

The process as described is not necessarily limited to the distillation of secondary butyl alcohol in the specific examples described, but has been successfully applied to the separation of ethyl, isopropyl, secondary butyl, and tertiary butyl alcohols from sulfuric acid solutions. It is also considered adaptable for the production of higher secondary and tertiary alcohols. Obviously, operating conditions suited to the production of one alcohol are not appropriate in all cases for the recovery of other alcohols. The chief variables capable of independent control are: (1) strength of acid discharge from the still; (2) the reflux ratio; (3) proportion of diluting water added to the feed; and (4) pressure.

The strength of acid discharged from the still will usually be such that it may be re-used for olefine absorption in a cyclic operation. For example, when separating tertiary butyl alcohol the acid concentration in the still may be maintained at about 50% by weight; when recovering isopropyl alcohol 70% acid may be produced, etc. However, the process is not limited to the production of an acid of sulfating strength, the production of 80% sulfuric acid from tertiary butyl acid liquor or 40% acid from isopropyl acid liquor being entirely feasible.

The reflux ratio in the column is particularly important because of its double function of concentrating alcohols and acid dilution. It is obvious that the higher the ratio of reflux to product, the easier it will be to obtain a distillate of concentrated alcohols. A high reflux ratio is desirable also for the purpose of diluting the acid liquor to such an extent that alcohol decomposition in the stripping section of the column is minimized. In the event that the alcohol has a relatively low vapor pressure from sulfuric acid solutions (e. g. ethyl alcohol) a high reflux ratio is desirable in order to insure complete alcohol stripping in the column, thereby preventing its entrance into the relatively hot concentrated acid in the still. Offsetting the advantages of high reflux ratio is the counteracting factor of high heat consumption. Evidently the selection of the best reflux ratio for recovery of alcohols from a given acid liquor will result from an economic balance between heat consumption, alcohol decomposition, concentration of distillate of alcohols desired, and height or plate equivalency of the fractionating column to be used. Expressing the reflux ratio as mols of reflux per mol. of an alcohol-water product, the following specific examples may be cited as suitable for the given acid liquor feeds: 3:1 when feeding a mixture containing 11% secondary butyl alcohol, 30% water, and 59% sulfuric acid by weight and yielding a distillate containing 70% alcohols by weight; 5:1 when feeding a mixture containing 11% ethyl alcohol, 28% water, and 61% sulfuric acid by weight and yielding a distillate containing 90% alcohol by weight.

The proportion of diluting water which should be added to the acid liquor feed is a function of the strength of acid discharged from the still and strength of distillate of alcohols withdrawn from the top of the column, any two of the three variables being independent. Usually it is desirable to produce an acid of sulfating strength and a distillate of alcohols which approaches the constant boiling mixture with water. The proportion of diluting water which should be added to the feed is then automatically fixed, the amount being such that a material balance results between the feed, the acid discharge, and the distillate of alcohols.

Pressure is a further variable requiring mention. From a process standpoint the use of vacuum is not essential, it being possible to obtain good yields of alcohol at atmospheric pressure. However, the use of vacuum does tend to minimize a slight decomposition, reference to the attached table showing that in comparative distillations of tertiary butyl acid liquor 4.5% decomposition was obtained at one atmosphere and only 0.3% at 0.15 atmosphere pressure. In certain instances the use of reduced pressure may be desirable from an engineering standpoint. For example, if the heat for distillation is supplied by steam coils the application of vacuum to the still permits the use of relatively low pressure steam within the coils. A further factor to be considered is the corrosion of the equipment, reduced pressure lowering the temperature of the acid and thereby minimizing corrosion.

To illustrate the process of this invention, we have hereinafter tabulated the results of representative distillations by prior batch processes and the continuous process of this invention. The examples permit two types of comparison: (1) the comparison between two processes when the same acid liquor feed is used, giving the difference in the percentage of recovery of the alcohols by the two methods; (2) where the same percentage of alcohols is obtained by the two methods, the table shows the increased acid dilution required by the batch process.

*Comparison of batch and continuous methods of alcohol distillation*

| Example No. | Alcohol | Feed composition | | | Distillate composition | |
|---|---|---|---|---|---|---|
| | | Weight percent alcohol | Weight percent acid | Weight percent water | Weight percent alcohol | Weight percent water |
| 1 | Secondary butyl | 5.3 | 64.3 | 30.4 | 67 | 33 |
| 2 | ---do--- | 5.3 | 64.3 | 30.4 | 70 | 30 |
| 3 | ---do--- | 5.0 | 28.5 | 66.5 | 72 | 28 |
| 4 | Tertiary butyl | 17.3 | 43.5 | 39.2 | 80 | 20 |
| 5 | ---do--- | 17.3 | 43.5 | 39.2 | 85 | 15 |
| 6 | ---do--- | 17.0 | 8.3 | 74.7 | 88 | 12 |
| 7 | ---do--- | 11.0 | 43.5 | 45.5 | 86 | 14 |
| 8 | Ethyl | 10.3 | 70.7 | 19.0 | 73 | 27 |
| 9 | ---do--- | 10.3 | 71.0 | 18.7 | 79 | 21 |

*Comparison of batch and continuous methods of alcohol distillation*

| Example No. | Composition of discharge from still | | Pressure in atmospheres | Batch or continuous | Percent recovery of alcohol |
|---|---|---|---|---|---|
| | Weight percent acid | Weight percent water | | | |
| 1 | 70 | 30 | 1.00 | Continuous | 95 |
| 2 | 65 | 35 | 1.00 | Batch | 14 |
| 3 | 30 | 70 | 1.00 | Do | 93 |
| 4 | 56 | 44 | 1.00 | Continuous | 95.5 |
| 5 | 50 | 50 | 1.00 | Batch | 9 |
| 6 | 10 | 90 | 1.00 | Do | 80 |
| 7 | 50 | 50 | 0.15 | Continuous | 99.7 |
| 8 | 80 | 20 | 0.15 | Do | 67 |
| 9 | 80 | 20 | 0.15 | Batch | 17 |

As will be noted from the accompanying tabulation, the process of this invention is decidedly superior to the results obtained by the prior batch process. For example, when feeding the indicated secondary butyl acid liquor, a 95% yield is obtained by the continuous process, and only a 14% yield by the batch process. Even when the acid liquor fed to the batch still contained a much larger proportion of water than that fed to the continuous still, the latter gave a somewhat higher yield of alcohols.

Among the further advantages of the process of this invention are: (1) that it is simple to operate; (2) the apparatus required represents a lower investment; (3) there is a saving of heat in the process. The comparative simplicity of the operation is evident from the above discussion. A lower investment in equipment is obtained in that a separate acid concentrating still is not essential. Heat consumption in the batch distillation represents the sum of the heat required to concentrate a relatively dilute acid and the heat required to supply reflux for the concentration of alcohols. The total heat consumption in the continuous process of this invention is simply the heat required to concentrate the relatively strong acid at the bottom of the fractionating column to the acid of sulfating strength discharged from the still.

While the particular process herein described is well adapted for carrying out the process of the present invention, it is to be understood that various modifications of this may be made, all without departing from the principles of the invention, and this invention includes all such modifications and changes as come within the scope of the appended claims.

We claim:

1. A continuous process of distilling an alcohol from an alcohol-yielding sulfuric acid liquor, which comprises continuously introducing such liquor into the central portion of a reflux column, continuously withdrawing liquor from the lower portion of said column and passing the same through a boiler, from which liquid and steam are returned to the lower end of said column, continuously withdrawing substantially an alcohol-free sulfuric acid from the bottom of the column, continuously withdrawing an alcohol-rich distillate from the upper portion of the column, and continuously returning a reflux liquid to said column.

2. A continuous process of distilling an alcohol from mixtures containing the equivalent of sulfuric acid, an alcohol and water, which comprises introducing said mixtures continuously into the central portion of a reflux column, continuously withdrawing liquid from the lower portion of said column, and passing the same through a heating zone wherein said liquid is boiled and from which the liquid and generated steam are returned to said column, continuously withdrawing from the column substantially an alcohol-free sulfuric acid of suitable strength for absorption of olefine corresponding to said alcohols, and continuously withdrawing an alcohol-rich distillate from the upper end of the column and returning a portion thereof as reflux liquid.

3. A continuous process of distilling an alcohol from an alcohol-yielding sulfuric acid liquor, which comprises continuously passing such liquor to the central portion of a reflux column, therein continuously refluxing liquid and separately withdrawing substantially an alcohol-free sulfuric acid from the lower portion of the column and an alcohol-rich distillate from the upper portion of the column, and removing liquid from said column continuously and passing the same through a boiling zone from which the liquid and generated steam are returned to the lower portion of said column.

4. A continuous process of distilling an alcohol from an alcohol-yielding sulfuric acid liquor, which comprises continuously passing such liquor to the central portion of a reflux column, therein continuously refluxing liquid and separately withdrawing substantially an alcohol-free sulfuric acid from the lower portion of the column and an alcohol-rich distillate from the upper portion of the column, and removing liquid from said column continuously and passing the same through a boiling zone from which the liquid and generated steam are returned to the lower portion of said column, the sulfuric acid withdrawn from the lower portion of the column being of suitable strength for sulfating the olefine corresponding to the alcohol to be distilled.

5. A continuous process of distilling an alcohol from an alcohol-yielding sulfuric acid liquor, which comprises continuously passing such liquor to the central portion of a reflux column, therein continuously refluxing liquid and separately withdrawing substantially an alcohol-free sulfuric acid from the lower portion of the column and an alcohol-rich distillate from the upper portion of the column, removing liquid from said column continuously and passing the same through a boiling zone from which the liquid and generated steam are returned to the lower portion of said column, the sulfuric acid withdrawn from the lower portion of the column being of suitable strength for sulfating the olefine corresponding to the alcohol to be distilled, and maintaining the reflux column under a reduced pressure below atmospheric.

6. A continuous process of distilling an alcohol from an alcohol-yielding sulfuric acid liquor, which comprises continuously passing such liquor to the central portion of a reflux column, therein continuously refluxing liquid and separately withdrawing substantially an alcohol-free sulfuric acid from the lower portion of the column and an alcohol-rich distillate from the upper portion of the column, removing liquid from said column continuously and passing the same through a boiling zone from which the liquid and generated steam are returned to the lower portion of said column, the sulfuric acid withdrawn from the lower portion of the column being of suitable strength for sulfating the olefine corresponding to the alcohol to be distilled, maintaining the reflux column under a reduced pressure below atmospheric, and continuously maintaining the reflux ratio within the column sufficiently high to prevent a large alcohol decomposition therein.

7. A continuous process of distilling an alcohol from an alcohol-yielding sulphuric acid liquor, which comprises continuously introducing such liquor into the central portion of a reflux column, continuously withdrawing substantially alcohol-free liquor from the lower portion of said column, continuously heating the said alcohol-free liquor to cause partial vaporization of water therefrom, continuously returning the said vaporized water (steam) to the lower end of the column and causing its upward passage therethrough, whereby the alcohol is substantially completely vaporized from the liquor prior to its withdrawal from the lower portion of the column, continuously withdrawing a substantially alcohol-free sulphuric acid of concentration about 50% $H_2SO_4$ or above from the bottom of the column, continuously withdrawing an alcohol-rich distillate from the upper portion of the column, and continuously returning a reflux liquid to said column.

8. A continuous process of distilling alcohol from alcohol-yielding sulphuric acid liquors, which comprises continuously passing such liquors, without preliminary dilution with water, to the central portion of a reflux column, therein continuously refluxing liquid and separately withdrawing a substantially alcohol-free sulphuric acid from the lower portion of the column and an alcohol-rich distillate from the upper portion of the column, continuously passing the withdrawn sulphuric acid into a boiling zone from which water vapors are continuously evolved, passing the evolved water vapors upwardly into the lower portion of the reflux column, and removing sulphuric acid from the boiling zone.

9. A continuous process of distilling alcohol from alcohol-yielding sulphuric-acid liquors, which comprises continuously passing such liquors to the central portion of a reflux column, therein continuously refluxing liquid, continuously withdrawing an alcohol-rich distillate from the top of the column, continuously returning a reflux liquid to the said column, continuously withdrawing liquor from the lower portion of the column and passing the same through a boiler from which liquid and evolved water vapors are returned to the lower end of said column, and continuously removing from the bottom of the said column a substantially alcohol-free sulphuric acid of higher acid concentration than the liquor passed to the said boiler.

10. A continuous process of distilling secondary butyl alcohol from the liquor resulting from the sulphuric acid absorption of normal butenes, which comprises continuously introducing such product into the central portion of a reflux column, continuously withdrawing substantially alcohol-free liquor from the lower portion of said reflux column to the bottom section thereof, continuously heating the said alcohol-free liquor in said bottom section to cause partial vaporization of water therefrom and to cause the concentration of the said alcohol-free liquor to a sulphuric acid of about 70% $H_2SO_4$, continuously returning the said vaporized water (steam) to the lower end of the column and causing its upward passage therethrough, whereby the alcohol is substantially completely vaporized from the liquor prior to its withdrawal from the lower portion of the column, continuously withdrawing a substantially alcohol-free sulphuric acid from the bottom of the column, continuously withdrawing an alcohol-rich distillate from the upper portion of the column, and continuously returning a reflux liquid to said column.

11. A continuous process of distilling tertiary butyl alcohol from the liquor resulting from the sulphuric acid absorption of isobutene, which comprises continuously introducing such product into the central portion of a reflux column, continuously withdrawing substantially alcohol-free liquor from the lower portion of said reflux column, continuously heating the said alcohol-free liquor to cause partial vaporization of water therefrom and to cause the concentration of the said alcohol-free liquor to a sulphuric acid of about 50% $H_2SO_4$, continuously returning the said vaporized water (steam) to the lower end of the column and causing its upward passage therethrough, whereby the alcohol is substantially completely vaporized from the descending liquor prior to its withdrawal from the lower portion of the column, continuously withdrawing a substantially alcohol-free sulphuric acid from the bottom of the column, continuously withdrawing an alcohol-rich distillate from the upper portion of the column, and continuously returning a reflux liquid to said column.

12. A continuous process of distilling isopropyl alcohol from the liquor resulting from the sulphuric acid absorption of propylene, which comprises continuously introducing such product into the central portion of a reflux column, continuously withdrawing substantially alcohol-free liquor from the lower portion of said reflux column, continuously heating the said alcohol-free liquor to cause partial vaporization of water therefrom and to cause the concentration of the said alcohol-free liquor to a sulphuric acid of about 70% $H_2SO_4$, continuously returning the said vaporized water (steam) to the lower end of the column and causing its upward passage therethrough, whereby the alcohol is substantially completely vaporized from the descending liquor prior to its withdrawal from the lower portion of the column, continuously withdrawing a substantially alcohol-free sulphuric acid from the bottom of the column, continuously withdrawing an alcohol-rich distillate from the upper portion of the column, and continuously returning a reflux liquid to said column.

13. A continuous process of distilling alcohols from the sulphuric acid absorption product of olefines, which comprises continuously introducing such absorption product into the central portion of a reflux column, continuously withdrawing substantially alcohol-free liquor from the lower portion of said column, continuously heating the said alcohol-free liquor to cause partial vaporization of water therefrom, continuously returning the said vaporized water (steam) to the lower end of the column and causing its upward passage therethrough, continuously withdrawing a substantially alcohol-free sulphuric acid from the bottom of the column, continuously withdrawing an alcohol-rich distillate from the upper portion of the column, continuously condensing the alcohol-rich distillate, continuously separating uncondensed gases from the condensed distillate, continuously extracting alcohol from the uncondensed gases by contact with water, continuously returning such water containing extracted alcohol and admixing it with the said sulphuric acid absorption product of olefines prior to its entry to the central portion of the column, and continuously returning a reflux liquid to said column.

14. A continuous process of distilling alcohols from the liquor resulting from the sulphuric acid absorption of olefines, which comprises continuously introducing such absorption product into the central portion of a reflux column and at a point at which the reflux liquid in the column consists substantially entirely of water, continuously withdrawing substantially alcohol-free liquor from the lower portion of said column to the bottom section thereof, continuously heating the said alcohol-free liquid to cause partial vaporization of water therefrom, continuously returning the said vaporized water (steam) to the lower end of the column and causing its upward passage therethrough, continuously withdrawing a substantially alcohol-free sulphuric acid from the bottom of the column, continuously withdrawing an alcohol-rich distillate from the upper portion of the column, and continuously returning a reflux liquid to said column.

15. A continuous process of distilling alcohols from the liquor resulting from the sulphuric acid absorption of olefines, which comprises continuously introducing such product into the central portion of a reflux column, continuously withdrawing acid liquor from the lower portion of said column to the bottom section thereof continuously heating the said acid liquor to cause partial vaporization of water therefrom, continuously returning the vaporized water (steam) to the lower portion of the column and causing its upward passage therethrough, continuously removing a substantially alcohol-free sulphuric acid from the bottom of the column, continuously withdrawing alcohol-rich vapors from the top of the column, condensing the said alcohol-rich vapors, separating uncondensed gases therefrom, continuously returning the condensed alcohol-rich liquid to the top of the column, and withdrawing a part of the condensed returned alcohol-rich liquid from an upper portion of the column.

16. A process of distilling alcohols of two, three and four carbon atoms in the molecule from sulphuric acid absorption products of olefines corresponding thereto, which comprises introducing into the central portion of a reflux column an olefine absorption product which contains the equivalent of at least 1.0 part of $H_2SO_4$ per 1.0 part of $H_2O$, by weight, therein continuously refluxing liquid and separately withdrawing a substantially alcohol-free sulphuric acid from the lower portion of the column and an alcohol-rich distillate from the upper portion of the column, continuously passing the withdrawn sulphuric acid into a boiling zone from which water vapors are continuously evolved, passing the evolved water vapors upwardly into the lower portion of the reflux column, and removing sulphuric acid from the boiling zone.

17. A process of distilling ethyl alcohol from the sulphuric acid absorption product of ethylene which comprises introducing into the central portion of a reflux column an ethylene absorption product which contains the equivalent of at least 3.5 parts of $H_2SO_4$ per 1.0 part of $H_2O$, by weight, therein continuously refluxing liquid and separately withdrawing a substantially alcohol-free sulphuric acid from the lower portion of the column and an alcohol-rich distillate from the upper portion of the column, continuously passing the withdrawn sulphuric acid into a boiling zone from which water vapors are continuously evolved, passing the evolved water vapors upwardly into the lower portion of the reflux column, and removing sulphuric acid from the boiling zone.

18. A process of distilling secondary butyl alcohol from the sulphuric acid absorption product of normal butenes, which comprises introducing into the central portion of a reflux a normal butene absorption product which contains the equivalent of at least 2.0 parts of $H_2SO_4$ per 1.0 part of $H_2O$, by weight, therein continuously refluxing liquid and separately withdrawing a substantially alcohol-free sulphuric acid from the lower portion of the column and an alcohol-rich distillate from the upper portion of the column, continuously passing the withdrawn sulphuric acid into a boiling zone from which water vapors are continuously evolved, passing the evolved water vapors upwardly into the lower portion of the reflux column, and removing sulphuric acid from the boiling zone.

19. A process of distilling tertiary butyl alcohol from the sulphuric acid absorption product of isobutene, which comprises introducing into the central portion of a reflux column an isobutene absorption product which contains the equivalent of at least 1.0 part of $H_2SO_4$ per 1.0 part of $H_2O$, by weight, therein continuously refluxing liquid and separately withdrawing a substantially alcohol-free sulphuric acid from the lower portion of the column and an alcohol-rich distillate from the upper portion of the column, continuously passing the withdrawn sulphuric acid into a boiling zone from which water vapors are continuously evolved, passing the evolved water vapors upwardly into the lower portion of the reflux column, and removing sulphuric acid from the boiling zone.

WILLIAM H. SHIFFLER.
MELVIN M. HOLM.